June 20, 1933. W. E. ROBEY, JR 1,914,460
TRANSMISSION
Filed April 13, 1932  3 Sheets-Sheet 2
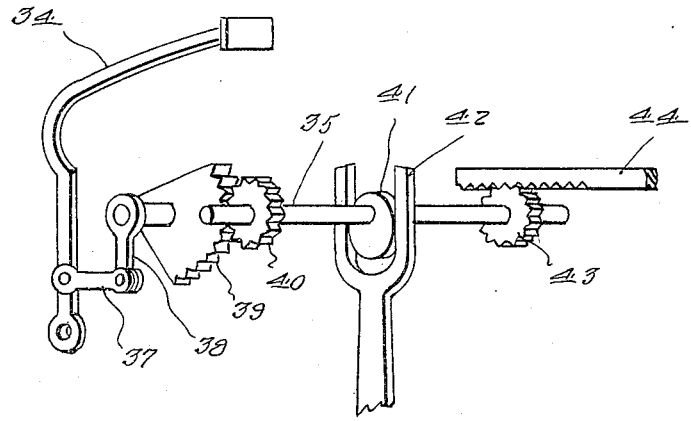
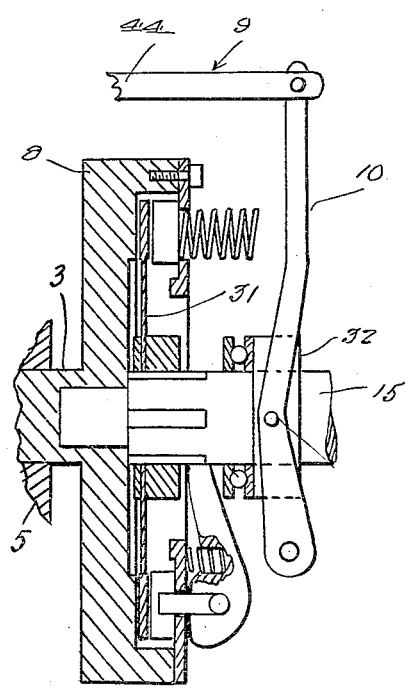
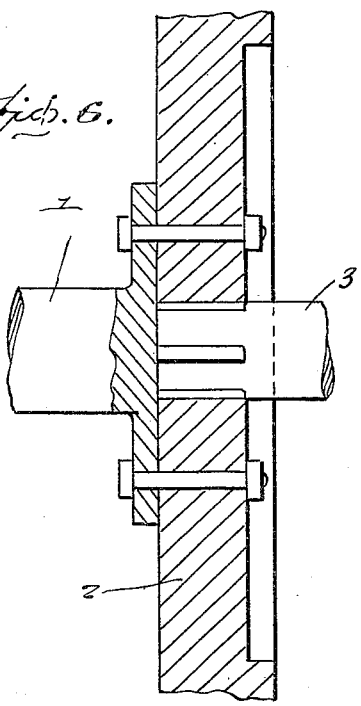
Inventor
W. E. Robey, Jr.
By Clarence A. O'Brien
Attorney June 20, 1933. W. E. ROBEY, JR 1,914,460

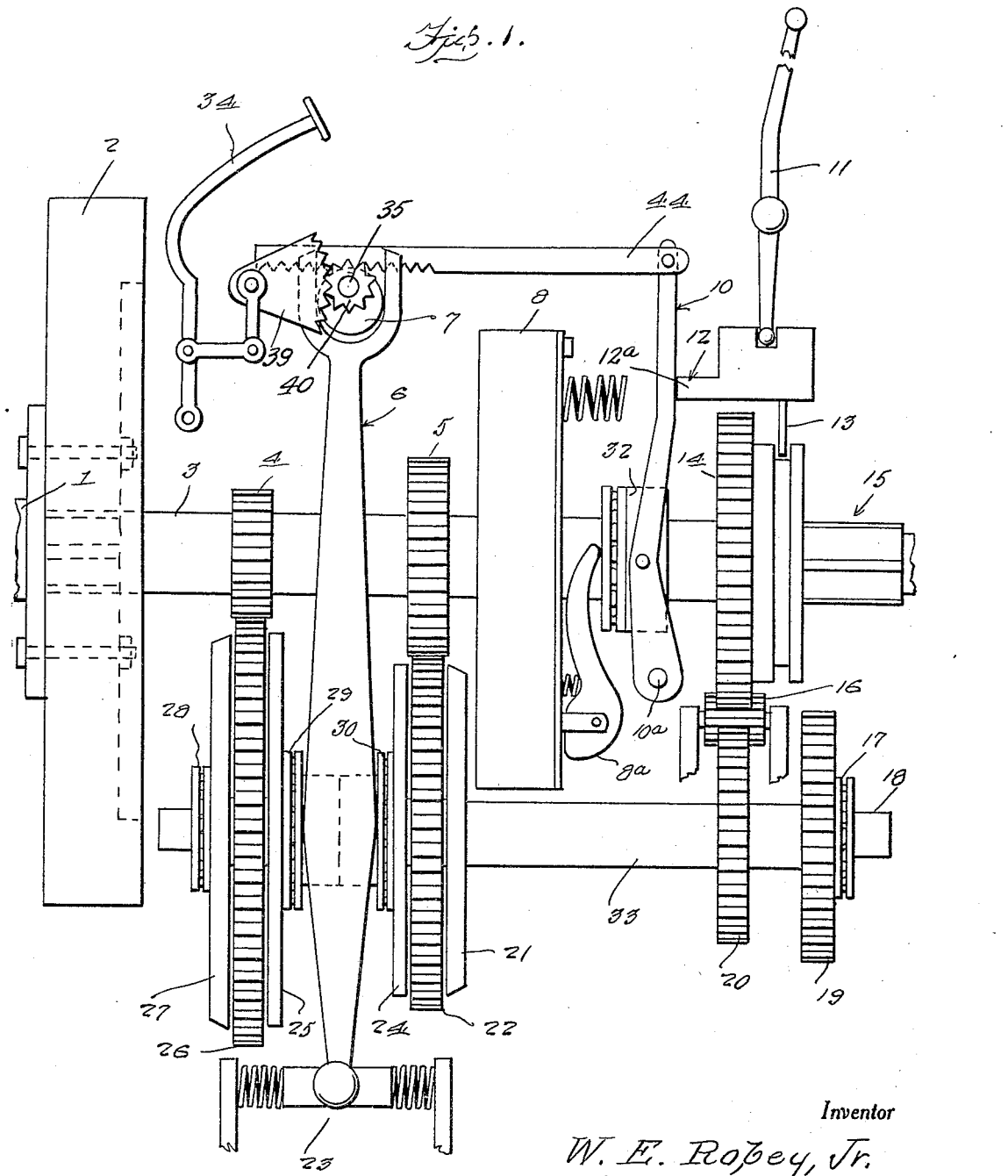

TRANSMISSION

Filed April 13, 1932 3 Sheets-Sheet 3

Inventor

W. E. Robey, Jr.

By Clarence A. O'Brien

Attorney

Patented June 20, 1933

1,914,460

UNITED STATES PATENT OFFICE

WILLIAM EDGAR ROBEY, JR., OF NORTH LITTLE ROCK, ARKANSAS

TRANSMISSION

Application filed April 13, 1932. Serial No. 605,100.

My invention relates to change speed power transmission devices, and particularly to a non-clashing, automatic change speed transmission for a motor vehicle and the like.

It is an important object of my invention to provide a transmission of this type which will positively eliminate the possibility of clashing gears in shifting the gears, since all forward speed gears in my invention are in constant mesh.

It is also an important object of my invention to provide a transmission of this class which comprises few and simple parts of relatively low manufacturing cost, and which have a new cooperation, whereby the changing or shifting of gears is accomplished with greater speed and smoothness.

Other objects and advantages of my invention will be apparent from a reading of the following description of the drawings, wherein:—

Figure 1 is a general side elevational view of the embodiment.

Figure 2 is a longitudinal vertical sectional view through the main clutch.

Figure 5 is a perspective view of the operating pedal mechanism.

Figure 6 is a longitudinal vertical sectional view through the flywheel of the embodiment.

Figure 3:
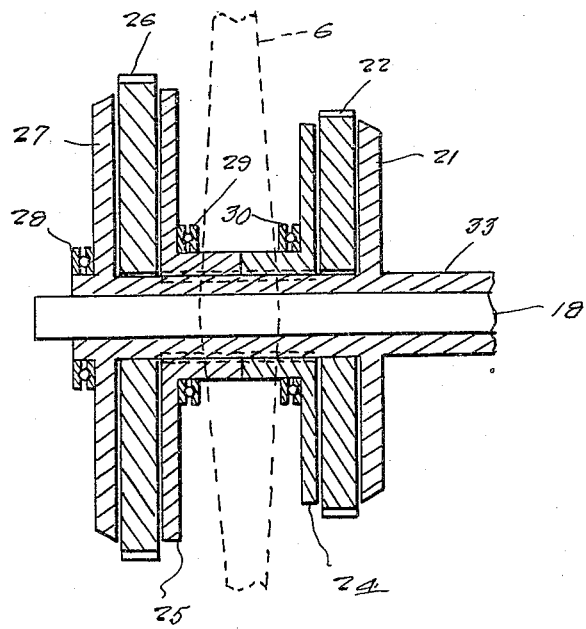
Figure 3 is a longitudinal vertical sectional view through the auxiliary clutches.
Figure 4:
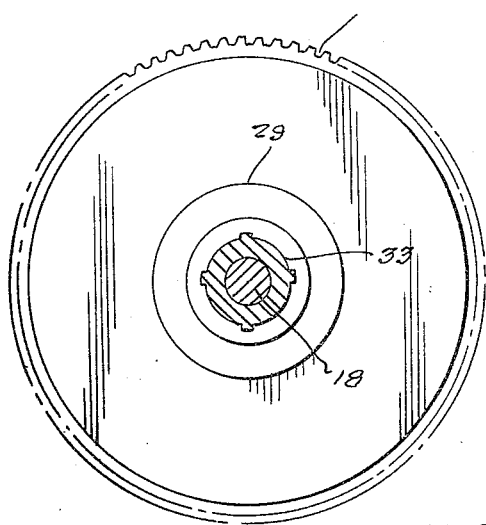
Figure 4 is a transverse vertical sectional view through one of the auxiliary clutch mountings.

Referring in detail to the drawings, wherein for purposes of illustration I have shown a preferred embodiment of the invention, and wherein like numerals refer to like parts throughout the same, the numeral 1 refers generally to an engine crank shaft having a conventional coupling flange to which is bolted a flywheel 2. The forward end of a transmission drive shaft 3 is splined into the flywheel 2 as shown in dotted lines in Figure 1. The rear end of the transmission drive shaft 3 carries the clutch body 8 of the main clutch assembly. Fixed on the drive shaft 3 between the flywheel 2 and the main clutch body 8 is the low-speed gear 4 and rearwardly spaced therefrom the second-speed gear 5.

To the rear of the transmission drive shaft 3 and axially aligned therewith is the driven shaft 15 whose forward end enters a recess in the main clutch body in bearing relation thereto as shown in Figure 2. Immediately rearward of the portion of the driven shaft 15 which enters the recess in the main clutch body 8, there is slidably splined on the shaft 15 the plate element 31 of the main clutch assembly.

The main clutch assembly has a plate element operating cam lever 8a, the arm of which is operatively engageable by a throw-out bearing 32 which is rotatably and slidably mounted on the driven shaft 15 to the rear of the plate element 31 and operating lever 8a. For operating the throw-out bearing 32, there is provided the vertical lever 10 suitably pivotally supported at its lower end below the driven shaft 15 as indicated at 10a and having pivotal connection intermediate its ends with the throw-out bearing.

To the rear of the throw-out bearing 32, the driven shaft 15 has a spline portion on which is non-rotatably mounted a selector gear 14 capable of being moved forwardly and rearwardly on the spline portion.

Below the main transmission drive shaft 3 is a carrying shaft 18 on which is rotatably mounted a tubular counter shaft 33 which has fixed thereon in the following spaced order from front to rear, the auxiliary clutch body 27, the auxiliary clutch body 21, the reverse drive gear 20, and the first and second speed drive gear 19. The selector gear 14 is mounted as described so that it may be selectively meshed with either the first and second speed drive gear 19, or the reverse idler gear 16 which is suitably mounted in constant mesh with the reverse drive gear 20.

Slidable but not rotatable on the tubular counter gear shaft 33 one behind the other between the auxiliary clutch bodies 27 and 21 are movable clutch elements comprising sleeves carrying exterior thrust bearings 29 and 30, respectively. The front end of the forward sleeve has fixed thereto the plate 25, while the rear end of the rearward sleeve has fixed thereto the plate 24. Rotatable on the tubular shaft 33 between the forward auxiliary clutch body 27 and the plate 25 is the first or low speed counter gear 26 which is arranged to be in constant mesh with low-speed gear 4. Similarly mounted on the tubular shaft 33 between the plate 24 and the rearward auxiliary clutch body 21 is the second speed counter gear 22 which is arranged to be in constant mesh with second speed gear 5.

Means for selectively shifting the plates 25, 24 into and out of engagement with the counter gears 26, 22 comprises the vertical lever 6 whose lower end is pivotally and yieldably mounted as indicated at 23. An intermediate portion of the lever 6 is engaged with the plates 25 and 24 between their thrust bearings 29, 30, respectively. When the lever 6 is moved so as to engage either plate 25 or 24 with either gear 26 or 22, the gear will be clamped between the related plate and its companion auxiliary clutch body so as to be connected more or less fixedly for rotation with the tubular counter shaft 33. Only sufficient clearance for free running of the gears 26, 22 is provided between these gears and their companion clutch bodies and clutch plates, so that the gears 26, 22 are never permitted to work laterally out of mesh with the gears 4, 5. Such gear being in constant mesh with its companion gear on the transmission drive shaft 3, the transmission drive shaft 3 and the tubular counter shaft 33 will be operatively connected.

The tubular counter shaft 33 is connectible to drive the driven shaft 15 in forward low and intermediate or second speeds through shifting the selector gear 14 into mesh with the drive gear 19. The counter shaft 33 is connectible to drive the driven shaft 15 in low and intermediate speeds in reverse through shifting the selector gear 14 into mesh with the reverse idler gear 16.

Control of the transmission described is effected through a clutch foot pedal operated mechanism for moving the levers 10 and 6 together, and a manual shift lever mechanism for shifting the selector gear 14.

The pedal operated mechanism comprises the rockably mounted clutch pedal 34, the pivotally mounted sector gear 39 operatively connected to the clutch pedal by a fixed arm 38 and a link 37. The sector gear 39 is meshed with a pinion 40 fixed on one end portion of a rotatable shaft 35 transversely mounted above the transmission structure described on a level with the upper ends of the levers 6 and 10. To the remaining end portion of the shaft 35 is fixed a pinion 43. Fixed to the shaft between the pinions 40 and 43 is a rotary cam 41.

The upper end of the auxiliary clutch operating arm 6 is bifurcated and receives between the furcations the rotary cam 41. The upper end of the main clutch operating lever 10 has pivotally connected thereto the rear end of a rack bar 44, the toothed underside of whose forward end portion is in mesh with the pinion 43.

Because of the arrangements described, movements of the clutch pedal 34 consequent upon manipulation thereof in a manner to be described, will be transmitted to the auxiliary and main clutch operating levers. Certain movement of the main clutch operating lever 10 may be effected under certain circumstances by the manual shift lever mechanism to be described.

The manual shift lever mechanism comprises a block 12 mounted for horizontal sliding movement backwardly and forwardly. The block's sliding movement is selectively achieved through manipulation of shift hand lever 11 which is rockably mounted intermediate its ends and has its lower end pivotally engaged with the block 12 as shown in Figure 1. Depending from the block 12 is a fork 13 which is engaged in a peripheral groove in the selector gear 14. Shifting the block full forwardly engages the selector gear with the reverse idler gear 16, while shifting the block 12 full rearwardly engages the selector gear 14 with the first and second speed drive gear 19. A forward projection 12a on the block 12 is provided for engaging and forwardly moving the main clutch operating lever 10 to disengage the main clutch plate element 31 as the selector gear is moved into mesh with the reverse idler 16. It will be obvious that pushing the hand shift lever 11 forwardly as far as it will go will move the selector block 12 all of the way to the rear for meshing selector 14 and drive gear 19; that pulling the hand shift lever 11 as far as it will go rearwardly will move the selector block 12 all of the way forwardly and mesh the selector gear 14 with reverse idler gear 16; and that moving the hand shift lever 11 to a position intermediate the forward and rearward positions will place the selector block 12 so that the selector gear 14 is in a disengaged, neutral position between the idler gear 16 and drive gear 19.

Supposing a motor vehicle to be equipped with the transmission described, the motor to be running, and the shift lever in neutral position (the selector gear 14 being then out of mesh with reverse idler gear 16 and low and second speed counter gear 19 so that the main shaft 15 and the countershaft 33 are disconnected) the first step in the process of putting the vehicle in forward low-speed is to fully depress clutch pedal 34 and thereby rotate sector gear 39 in a clockwise direction, causing pinion gear 40 to rotate in a counter clockwise direction. Pinion gears 40 and 43 and cam 41 all being securely fastened to shaft 35 and appropriately spaced thereon, it is evident that cam 41 and pinion gear 43 will be rotated in a counter clockwise direction. Assuming clutch pedal 34 to be in its fully engaged position when it is in its most upward position, the depression of clutch pedal 34 from fully engaged position to fully released depressed position will cause pinion gear 40 to rotate one complete revolution, as well as transverse shaft 35, cam 41, and pinion gear 43. Cam 41 is adjusted on transverse shaft 35 so as to be in a downward position when clutch pedal 34 is fully depressed. In this downward position the cam 41 does not exert such pressure on either furcation on the upper end of lever 6 as would cause lever 6 to confine either gear 26 or gear 22 between their clutch bodies 27 and 21 and plates 25 and 24, respectively. The pinion gear 43 and gear rack 44 are arranged so as to move the clutch lever 10 to its forwardmost position, when clutch pedal is fully depressed, whereby the main clutch plate element 31 in main clutch body 8 is released, through pressure applied by lever 10 through thrust bearing 32 to operating lever 8a. Since the main clutch element 31 is disengaged and auxiliary clutch assembly is disengaged when the clutch pedal is in the fully depressed position, the transmission drive shaft 3, countershaft 33, and driven shaft 14 are rotatable independently of each other.

The second step comprises pushing hand lever 11 to its forwardmost position so as to shift selector block 12 carrying fork 13, to its rearmost position. The selector block 12 is so adjusted that as it is moved into this position it will slide selector gear 14 on driven shaft 15, into mesh with low and second speed drive gear 19, thereby connecting driven shaft 15 and counter shaft 33 together to rotate at the speed ratios of gears 14 and 19.

Then the clutch pedal 34 is partly released from fully depressed position so as to cause sector 39 to rotate in the opposite or counter clockwise direction whereby the transverse shaft assembly including the cam 41 is rotated in a clockwise direction. This quarter revolution clockwise of the cam 41 causes the cam to operatively engage the forward furcation of lever 6, in a manner to move the lever 6 to its forwardmost position and slide plate 25 forwardly so as to confine counter gear 26 between clutch body 27 and plate 25. The gear 26 being in mesh with low speed gear 4 on drive shaft 3, the drive shaft 3 will then be connected with countershaft 33. The driven shaft gear 14 being in mesh with countershaft gear 19 by virtue of the first operation explained, the transmission is in low gear, the drive being through the main shaft 3, the gears 4, 26, the countershaft 33, and the gears 19, 14.

To disengage first gear and engage second gear the clutch pedal 34 is further released so that cam 41 will be rotated clockwise another quarter revolution to the halfway position so as to permit lever 6 to assume its initial neutral position. The return of the lever 6 to neutral position releases the gear 26 so that the counter shaft 33 is once again free to rotate independently of motor driven drive shaft 3. By permitting the clutch pedal 34 to come up still further cam 41 will be rotated another quarter revolution to the three quarter position in a clockwise direction, so as to thereby operatively engage the rearmost furcation of lever 6 in a manner to move the lever 6 rearwardly to slide plate 24 to confine countershaft gear 22 between clutch body 21 and plate 24 so as to connect gear 22 to the countershaft, gear 22 being in mesh with second speed gear 5 on motor driven drive shaft 3. Countershaft 33 will then drive driven shaft 15 through gears 19 and 14. This is second speed gear.

To place the transmission in high gear, the clutch pedal 34 is further released so as to rotate transverse shaft assembly another quarter revolution, completing the full revolution clockwise, and returning cam 41 to its initial downward position. The cam 41 being in this position, lever 6 will also be in its initial or neutral position, wherein gears 26 and 22 are free to rotate on counter shaft 33.

During the above described step by step release of the clutch pedal 34 from its fully depressed clutch disengaging position, the pinion gear 43 on the transverse shaft 35 has been rotated step by step in a clockwise direction so as to move the rack 44 progressively rearwardly in a manner to push the clutch lever 10 rearwardly. The rack 44 is so arranged that by the time clutch pedal 34 has been released enough to cause transverse shaft 35 and pinion gear 43 to rotate three quarters of a revolution in a clockwise direction, lever 10 will have been moved rearwardly enough to start engaging clutch element 31 in direct drive clutch 8, through release of pressure on thrust bearing 32 and operating lever 8a. As the clutch pedal 34 is completely released, direct drive clutch 8 is fully engaged and direct drive obtains through drive shaft 3, clutch 8, and driven shaft 15.

To place the transmission in reverse gear, the vehicle being at a standstill, clutch pedal 34 is fully depressed, and hand lever 11 pulled to its rearmost position. This shifts selector block 12 to its forwardmost position and slides selector gear 14 forwardly into mesh with reverse idler gear 16. The reverse idler gear is arranged in constant mesh with counter shaft gear 20. The operation of the transmission in reverse gear is substantially the same as in forward speeds. As clutch pedal is progressively released from its fully depressed position until transverse shaft 35 has revolved to the three quarter revolution position and in so doing has caused clutch lever 10 to move rearwardly, clutch lever 10 contacts a forward projection 12a on selector block 12, which prevents further rearward movement of the clutch lever 10 so that direct drive engagement of the clutch 8 is impossible while selector gear 14 is in mesh with reverse idler gear 16 in reverse gear. Two speeds are obtainable in reverse drive, corresponding to low and second speeds in forward drive. The drive in reverse gear is through drive shaft 3, gear 26 or gear 22, countershaft 33, counter gear 20, reverse idler gear 16, and selector gear 14.

While the clutch pedal 34 is being manipulated as described in the procedure for placing the transmission in the different speeds of forward and reverse drive, the motor throttle (accelerator) of the vehicle is progressively opened so as to speed up the motor gradually as the changes from low to high gear are made. It is unnecessary to fully release the accelerator and close the motor throttle between different gear ratio speed changes as is required in conventional transmissions to enable making the different changes of gears.

Though I have shown and described herein a preferred embodiment of the invention, it is to be definitely understood that I do not desire to limit the application of my invention thereto, and any change or changes may be made in structure and arrangement of parts, within the spirit of the invention and the scope of the subjoined claims.

What is claimed is:—

1. A change speed transmission comprising a drive shaft, a flywheel, low and intermediate gears, and a main clutch body fixed on the drive shaft, a driven shaft aligned with the drive shaft and carrying a movable main clutch element for cooperation with the clutch body, a counter shaft, low and intermediate counter gears freely mounted on the counter shaft and in constant mesh with the first mentioned low and intermediate gears, secondary clutch means on the counter shaft for selectively connecting either low or intermediate gear to the counter shaft, a drive connection between the counter shaft and the driven shaft, and means connected between the movable main clutch element and the secondary clutch means for successively operating the same in coordinated manner.

2. A transmission comprising a drive shaft, low and intermediate gear means fixed on the drive shaft, a direct drive clutch member fixed on the drive shaft, a propeller shaft arranged in extension of the drive shaft, a movable direct drive clutch element carried by the propeller shaft for engagement with the direct drive clutch member, longitudinally movable gear means on the propeller shaft; a countershaft, clutch bodies fixed on the countershaft, free gear means rotatable on the countershaft in constant mesh with the low and intermediate gear means on the drive shaft, longitudinally movable clutch elements on the countershaft for cooperating with the clutch bodies in locking either of said free gear means for rotation with the countershaft; a reverse gear, and a drive gear fixed on the countershaft for selective engagement by the longitudinally movable gear means on the propeller shaft; and shift means for selecting low, intermediate, and direct drive comprising spring positioned lever means for engaging said longitudinally movable clutch elements, clutch lever means for operating the movable direct drive clutch element, and clutch pedal operated gearing operatively connecting said spring positioned lever means and clutch lever means whereby low, intermediate, and direct drive may be successively engaged by progressive release of the clutch pedal.

3. A transmission comprising a drive shaft, low and intermediate gear means fixed on the drive shaft, a direct drive clutch member fixed on the drive shaft, a propeller shaft arranged in extension of the drive shaft, a movable direct drive clutch element carried by the propeller shaft for engagement with the direct drive clutch member, longitudinally movable gear means on the propeller shaft; a countershaft, clutch bodies fixed on the countershaft, free gear means rotatable on the countershaft in constant mesh with the low and intermediate gear means on the drive shaft, longitudinally movable clutch elements on the countershaft for cooperating with the clutch bodies in locking either of said free gear means for rotation with the countershaft; a reverse gear, and a drive gear fixed on the countershaft for selective engagement by the longitudinally movable gear means on the propeller shaft; and shift means for selecting low, intermediate, and direct drive comprising spring positioned lever means for engaging said longitudinally movable clutch elements, clutch lever means for operating the movable direct drive clutch element, and clutch pedal operated gearing operatively connecting said spring positioned lever means and clutch lever means whereby low, intermediate, and direct drive may be successively engaged by progressive release of the clutch pedal, and manual control means for shifting the longitudinally movable gear means on the propeller shaft into engagement with either the reverse gear or the drive gear on the countershaft, stop means on the manual control means for maintaining the movable main drive clutch element in neutral position while the low and intermediate drives are engaged.

4. A transmission comprising a main shaft, a counter shaft, a propeller shaft aligned with the main shaft, low and intermediate gear means and a direct drive clutch body fixed on the main shaft, a slidable gear and a slidable direct drive clutch plate element carried by the propeller shaft; a pair of secondary clutch bodies and a reverse and a forward drive gear fixed on the countershaft, slidable secondary clutch elements on the countershaft, freely rotatable and slidable driven gear means on the countershaft, said slidable secondary clutch elements being operable to confine the low and intermediate gear means between the clutch elements and the secondary clutch bodies in a manner to connect them selectively to the countershaft, said rotatable and slidable gear means being in constant mesh with the main shaft, low and intermediate gear means and operatively connectible to the counter shaft, secondary slidable clutch element selecting and operating means for operating the slidable clutch elements so as to connect the driven gear means to the counter shaft, and slidable direct drive clutch element shifting means, coordinating connection means between said secondary clutch selecting and operating means and the direct drive clutch element shifting means, and clutch-pedal operated control means for operating the coordination connection means for successively engaging low, intermediate and direct drive by progressively releasing the clutch pedal from a depressed position, and manual control means for shifting said sliding gear into engagement with either the drive gear or the reverse gear, and stop means carried by the manual control means for engaging the direct drive clutch element shifting means to hold the same in neutral position during engagement of the low and intermediate drives.

5. A transmission comprising a main shaft, a countershaft, a propeller shaft aligned with the main shaft, low and intermediate gear means and a direct drive clutch member fixed on the main shaft, and a sliding gear and a free movable direct drive clutch element carried by the propeller shaft; secondary clutch bodies and a reverse and a forward drive gear fixed on the countershaft, free clutch elements on the countershaft carrying free gear means on the countershaft in constant mesh with the low and intermediate gear means, secondary clutch selecting and operating means, and free movable direct drive clutch element shifting means, coordinating connection means between said secondary clutch selecting and operating means and the direct drive clutch element shifting means, and clutch-pedal operated control means for successively engaging low, intermediate and direct drive by progressively releasing the clutch pedal from a depressed position, and manual control means for shifting said sliding gear into engagement with either the drive gear or the reverse gear, and stop means carried by the manual control means for engaging the direct drive clutch element shifting means to hold the same in neutral position during engagement of the low and intermediate drives, said clutch-pedal operated control means comprising a rotatable element having teeth, clutch-pedal actuated means for rotating the rotatable element, a rack connected to the direct drive clutch element shifting means and engaged by the teeth of the control means, a cam fixed on the rotatable means and operatively engaged with the secondary clutch selecting and operating means.

6. A change speed transmission comprising a drive shaft, a driven shaft axially aligned with the drive shaft, a main clutch for operatively connecting the drive shaft and the driven shaft, low and intermediate gears fixed on the drive shaft, a counter shaft, low and intermediate counter gears rotatable on the counter shaft in constant mesh with the drive shaft gears, secondary clutch means on the counter shaft for connecting either low or intermediate counter gear to the counter shaft, forward and reverse drive gears fixed to the countershaft, a reverse idler gear supported in mesh with the reverse drive gear, shiftable driven gear means fixed on the driven shaft movable for engaging either the reverse idler gear or the forward drive gear, manual means for shifting the driven gear means, and selective control means connected between the movable elements of the main clutch and the secondary clutches for operating the same in progressive, coordinated manner, and other manual means for operating the selective control means.

7. A change speed transmission comprising a drive shaft, a driven shaft axially aligned with the drive shaft, a main clutch for operatively connecting the drive shaft and the driven shaft, low and intermediate gears fixed on the drive shaft, a countershaft, low and intermediate counter gears rotatable on the counter shaft and arranged in constant mesh with the drive shaft gears, secondary clutch means on the countershaft for connecting either low or intermediate counter gear to the counter shaft, a forward drive gear and a reverse drive gear fixed to the counter shaft, a reverse idler gear supported in mesh with the reverse drive gear, shiftable fixed gear means fixed on the driven shaft and fixed for rotation therewith and shiftable for engaging either the reverse idler gear or the forward drive gear, means for shifting the shiftable gear means, selective control means connected between the movable elements of the main clutch and of the secondary clutches for operating the same in progressive, coordinated manner, said selective control means comprising main clutch element operating lever means, secondary clutch element operating means, rotary cam and pinion means, pedal means connected to the rotary cam and pinion means for selectively rotating the cam and pinion means simultaneously, rack means connected to the main clutch lever element operating means and operatively engaged with the pinion means, and cam follower means on the secondary clutch element operating lever means engageable by the cam means for moving the same when the cam means is rotated.

8. A change speed transmission comprising a drive shaft, a driven shaft axially aligned with the drive shaft, a main clutch for operatively connecting the drive shaft and the driven shaft, low and intermediate gears fixed on the drive shaft, a counter shaft, low and intermediate counter gears rotatable on the counter shaft and arranged in constant mesh with the drive shaft gears, secondary clutch means on the counter shaft for connecting either low or intermediate counter gear to the counter shaft, a forward drive gear and a reverse drive gear fixed to the counter shaft, a reverse idler gear supported in mesh with the reverse drive gear, shiftable driven gear means on the shiftable shaft and shiftable for engaging either the reverse idler gear or the forward drive gear, means for shifting the driven gear means, selective control movable elements of the means connected between the main clutch and of the secondary clutches for operating the same in progressive, coordinated manner, and clutch pedal operated means for operating the selective control means.

9. A transmission comprising a drive shaft carrying fixedly a low drive gear, an intermediate drive gear, and a main clutch body; a driven shaft aligned with the drive shaft and carrying a main movable clutch element cooperable with the main clutch body for selectively connecting the drive shaft and driven shaft; a countershaft carrying rotatably a low counter gear, an intermediate counter gear, and pair of auxiliary movable elements and carrying fixedly a pair of auxiliary clutch bodies, a forward drive gear and a reverse drive gear, the low counter gear and the intermediate counter gear being located between companion auxiliary clutch bodies and auxiliary movable clutch elements so as to be confined thereby in constant mesh with the low and intermediate drive gears and in position to be gripped between the auxiliary clutch bodies and auxiliary movable clutch elements when the latter are forced together, lever means engaged with the auxiliary movable clutch elements and operable for forcing either one of the auxiliary movable clutch elements so as to clamp its companion counter gear between it and its companion auxiliary clutch body and thereby connect the companion counter gear to the countershaft; a reverse idler gear supported in constant mesh with the reverse drive gear; a slidable selector gear splined on the driven shaft and shiftable into mesh with either the reverse idler gear or the forward drive gear and in a neutral position therebetween for connecting the driven shaft and the countershaft in reverse or forward drive and disconnecting the same; coordinating means connected between the main clutch movable element and the lever means whereby the main clutch movable element is made to engage and disengage the main clutch body progressively, while the auxiliary clutch movable elements are alternately engaged and disengaged, operating means operatively connected to the coordinating means; and manual means for shifting the slidable selector means.

10. A transmission comprising a drive shaft carrying fixedly a low drive gear, an intermediate drive gear, and a main clutch body; a driven shaft aligned with the drive shaft and carrying a main movable clutch element cooperable with the main clutch body for selectively connecting the drive shaft and driven shaft; a countershaft carrying rotatably a low counter gear, an intermediate counter gear, and pair of auxiliary movable clutch elements and carrying fixedly a pair of auxiliary bodies, a forward drive gear and a reverse drive gear, the low counter gear and the intermediate counter gear being located between companion auxiliary clutch bodies and auxiliary movable clutch elements so as to be confined thereby in constant mesh with the low and intermediate drive gears and in position to be gripped between the auxiliary clutch bodies and auxiliary movable clutch elements when the latter are forced together, lever means engaged with the auxiliary movable clutch elements and operable for forcing either one of the auxiliary movable clutch elements so as to clamp its companion counter gear between it and its companion auxiliary clutch body and thereby connect the companion counter gear to the countershaft; a reverse idler gear supported in constant mesh with the reverse drive gear; a slidable selector gear splined on the driven shaft and shiftable into mesh with either the reverse idler gear or the forward drive gear and in a neutral position therebetween for connecting the driven shaft and the countershaft in reverse or forward drive and disconnecting the same; coordinating means connected between the main clutch movable element and the lever means whereby the main clutch movable element is made to engage and disengage the main clutch body progressively, while the auxiliary clutch movable elements are alternately engaged and disengaged, operating means operatively connected to the coordinating means; and manual means for shifting the slidable selector gear, and stop means on the manual means arranged to be engaged only when the manual means is in the reverse position by a portion of the coordinating means as the same approaches a position in which the main clutch movable element is completely engaged with the main clutch body whereby complete engagement thereof with the main clutch body while the selector gear is meshed with the reverse idler gear is prevented.

In testimony whereof I affix my signature.

WILLIAM EDGAR ROBEY, Jr.